Nov. 6, 1962
O. E. ANDRUS
3,062,507
MULTI-LAYER VESSEL HAVING A HEAT TRANSFER
MATERIAL DISPOSED BETWEEN LAYERS
Filed Nov. 18, 1957
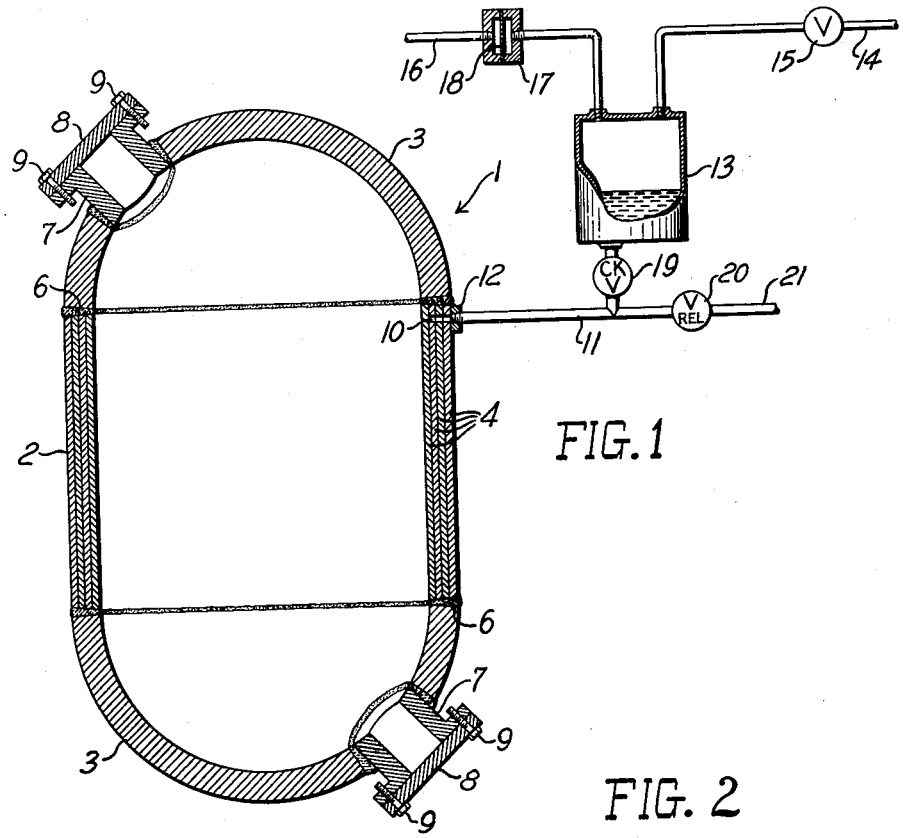
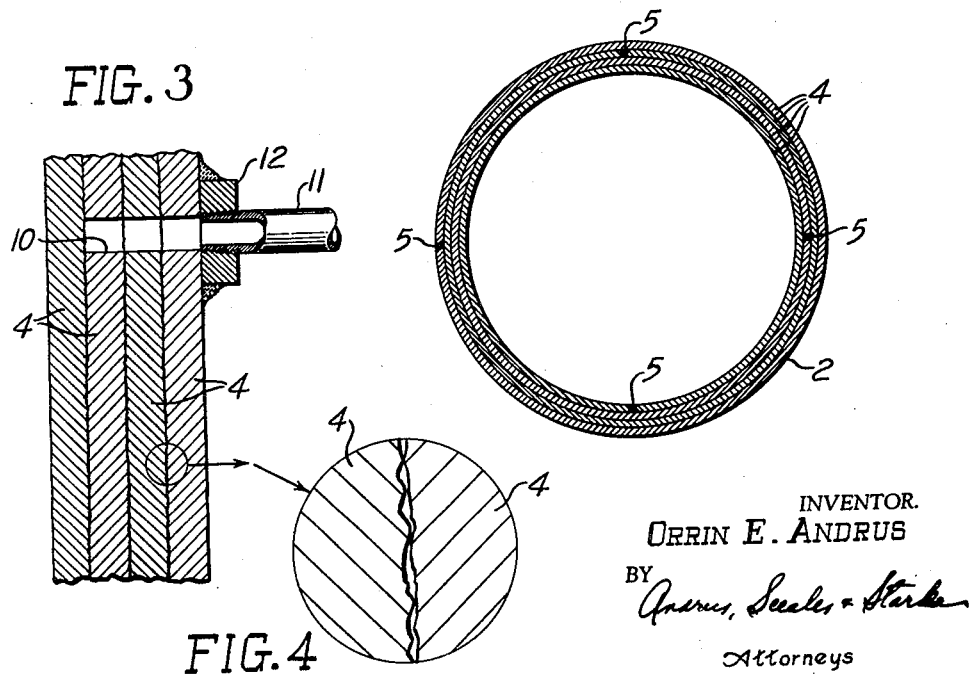
INVENTOR.
ORRIN E. ANDRUS
BY Andrus, Sceales & Starke
Attorneys United States Patent Office 3,062,507
Patented Nov. 6, 1962

3,062,507
MULTI-LAYER VESSEL HAVING A HEAT TRANSFER MATERIAL DISPOSED BETWEEN LAYERS
Orrin E. Andrus, Madison, Wis., assignor to A. O. Smith Corporation, Milwaukee, Wis., a corporation of New York
Filed Nov. 18, 1957, Ser. No. 697,035
2 Claims. (Cl. 257—212)

This invention relates to a multi-layer pressure vessel and more particularly to a means for reducing the interface contact resistance to the transfer of heat between the layers.

A multi-layer vessel which is used for processes containing high pressures and high temperatures is normally composed of a generally cylindrical shell formed of a series of superimposed metal layers which are tightly disposed around each other. The ends of the shell are enclosed by heads which can either be of solid construction or laminated similar to that of the shell. As the surfaces of the metal layers are not perfectly smooth since they are not machined and polished but instead contain the normal surface defects and irregularities, the entire adjacent surfaces of the layers may not be in continuous intimate contact. As it may be desirable in some applications to increase the heat transfer at the interface of the layers, the present invention is directed to a multi-layer pressure vessel having an improved heat transfer through the laminated vessel wall.

According to the invention, a heat transfer material having a high coefficient of thermal conductivity is disposed between adjacent layers in the vessel wall and reduces the interface contact resistance to the transfer of heat between the layers.

Other objects and advantages will appear in the course of the following description.

The drawings illustrate the best mode presently contemplated for carrying out the invention.

In the drawings:

FIGURE 1 is a vertical section of a pressure vessel incorporating the present invention;

FIG. 2 is a transverse section of the vessel wall;

FIG. 3 is an enlarged fragmentary section of the vessel wall showing the attachment of the pressure system; and FIG. 4 is an enlarged view of the encircled area in FIG. 3.

Referring to the drawings, there is shown a pressure vessel 1 adapted to contain materials under high pressures and temperatures and includes a generally cylindrical shell 2 which is enclosed by heads 3.

The shell 2 is formed of a series of superimposed metal layers 4 which are tightly disposed upon one another. As shown in the drawings, there are four layers 4, however, any number of layers can be employed depending on the particular use intended for the vessel.

Each of the layers 4 is formed of one or more sheets of metal which are secured together by longitudinal welds 5. The heads 3 are joined to the shell 2 by girth welds 6. The girth welds 6 in each layer can be staggered or offset from the welds 6 in adjacent layers, if desired, by machining the complementary edges of the shell 2 and heads 3.

The heads 3, while shown as solid metal members, may, as in the case of shell 2, be laminated from a plurality of metal sheets.

To introduce and remove materials from the vessel, suitable connections 7 are welded within openings in the heads 3. The outer end of each connection 7 is enclosed by a cover 8 which is secured to the connection 7 by bolts 9.

As the surfaces of the layers 4 are not machined or polished but instead contain the normal defects or irregularities of rolled metal, the adjacent faces of the layers may not be in continuous intimate contact.

To reduce the resistance to heat transfer at the interface, a heat transfer material having a relatively high coefficient of thermal conductivity is introduced between the layers.

The heat transfer material may be a metal such as sodium, potassium, sodium-potassium, mercury, gallium, cesium, rubidium, lead, tin or the like, which is a liquid at the temperatures encountered in the vessel wall. In addition, other liquid materials having a coefficient of thermal conductivity and other properties adequate for the process may be employed, such as Dowtherm, Arochlor or mineral oils. In addition, a gaseous medium, such as helium or hydrogen, having a coefficient of thermal conductivity substantially higher than that of air may also be used as the heat transfer material. As the transfer of heat between layers and through the above mentioned media is mainly by conduction, liquid metals, such as sodium, potassium, etc., are particularly effective as the heat transfer media.

Generally, the heat transfer material besides having a high coefficient of thermal conductivity should be non-corrosive and should not be adversely affected by radiation nor decompose or react with the metal layers at the temperatures and pressures involved. If the material is a metal, it should have a melting point within the temperature range encountered in the vessel wall, and if the material is a liquid, it should have a boiling point above the aforementioned range and have a low vapor pressure so that the material does not have to be contained under pressure to maintain it in liquid condition.

To introduce the heat transfer material between the layers, one or more openings 10 are provided in the vessel wall and extend from the exterior of the wall to the innermost layer 4. A pressure system is connected to the opening 10 and includes a conduit 11 which is secured to spud 12 and the spud, in turn, is secured by welding or the like to the outer surface of the vessel wall bordering the opening. The conduit 11 is connected to a closed storage tank 13 which contains the heat transfer material.

The heat transfer material is introduced into tank 13 through an inlet conduit 14, and the flow of the material through the conduit is controlled by a valve 15.

In the event that a leak should occur in the innermost layer 4, a pressure relief apparatus is employed in connection with the tank to quickly dissipate the pressures. The pressure relief apparatus includes an outlet conduit 16 which is connected to tank 13, and a diaphragm assembly 17 is disposed in conduit 16. The diaphragm assembly includes a flexible diaphragm 18 which is adapted to rupture if the pressure within the tank 13 exceeds a predetermined limit. The conduit 16 can be connected to a suitable discharge system employed to conduct the heat transfer material to a storage location or to discharge the same at a position where it will not injure or contaminate personnel or equipment.

If a hazardous material, such as liquid sodium, is employed as the heat transfer medium, it may be desired to employ a velocity responsive check valve 19 in conduit 11 to prevent any appreciable amount of water from the vessel from flowing into the pressure system. The check valve 19 would, however, permit fluid to enter tank 13 at a limited rate and a free flow of fluid in the opposite direction. With a dangerous material such as sodium, it may also be desired to employ an auxiliary pressure relief valve 20 which would be located in a branch conduit 21 communicating with conduit 11.

Depending on the specific heat transfer material various pressures may be employed in the tank 13. If a solid or liquid material is employed, pressure exerted through an inert gas may be desired to increase the rate of flow of the heat transfer material when rapid changes in temperature occur in the vessel wall as by alternate heating and cooling.

In operation, any air contained between adjacent faces of the layers 4 is initially evacuated by any conventional method and the heat transfer material in tank 13 is introduced between layers and reduces the thermal resistance at the interface.

While the above description is directed to the use of a single pressure system to introduce the heat transfer material between the layers, it is contemplated that a plurality of such systems may be used.

The openings 10, while shown as a straight continuous opening extending through the layers, may instead be a series of separate staggered openings or weep holes formed in each layer or in a series of layers and which communicate with the interfaces of the layers to provide a passage extending from the innermost layer to the outer surface of the vessel.

The present invention provides an improved heat transfer between the metal layers of the vessel. In addition to providing an increased heat transfer through the vessel wall, the closed system containing the heat transfer material serves as a safety device which provides a warning of pressure increases between the layers in the event a leak occurs in the innermost layer and functions to discharge the pressure to a remote location.

Various modes of carrying out the invention are contemplated as being within the scope of the following claims particularly pointing out and distinctly claiming the subject matter which is regarded as the invention.

I claim:

1. A high pressure vessel having a substantial pressure retaining portion of its wall comprised of a large number of layers of sheet metal disposed in tight substantially co-extensive stress transmitting contact with each other and in which numerous undetermined connecting voids occur between the surfaces of adjacent layers, and a fluid having a coefficient of thermal conductivity higher than air substantially filling said voids and displacing the air therefrom and which provides a more uniform heat transfer between the layers to prevent areas of substantially different temperature gradient within the vessel walls, and means for maintaining a positive pressure on said fluid less than the working pressure of the vessel.

2. A high pressure vessel having a substantial pressure retaining portion of its wall comprised of a large number of layers of sheet metal disposed in tight substantially co-extensive stress transmitting contact with each other and in which numerous undetermined connecting voids occur between the surfaces of adjacent layers, and a fluid having a coefficient of thermal conductivity higher than air substantially filling said voids and displacing the air therefrom and which provides a more uniform heat transfer between the layers to prevent areas of substantially different temperature gradient within the vessel walls, means for maintaining said fluid under a positive pressure substantially less than the operative working pressure of the vessel whereby it leaves the individual layers free to move and to transmit the working stress through direct contact from layer to layer.

References Cited in the file of this patent

UNITED STATES PATENTS

| | | |
|---|---|---|
| 1,400,179 | Pfeiffer | Dec. 13, 1921 |
| 1,672,036 | Oltman | June 5, 1928 |
| 1,922,509 | Thurm | Aug. 15, 1933 |
| 1,925,118 | Stresau | Sept. 5, 1933 |
| 2,057,124 | Van Gessel et al. | Oct. 13, 1936 |
| 2,577,254 | Lawson | Dec. 4, 1951 |
| 2,631,015 | Probst | Mar. 10, 1953 |
| 2,635,805 | Baumann | Apr. 21, 1953 |
| 2,772,860 | Nelson | Dec. 4, 1956 |

FOREIGN PATENTS

| | | |
|---|---|---|
| 490,558 | Germany | Jan. 30, 1930 |